Patented Dec. 26, 1933

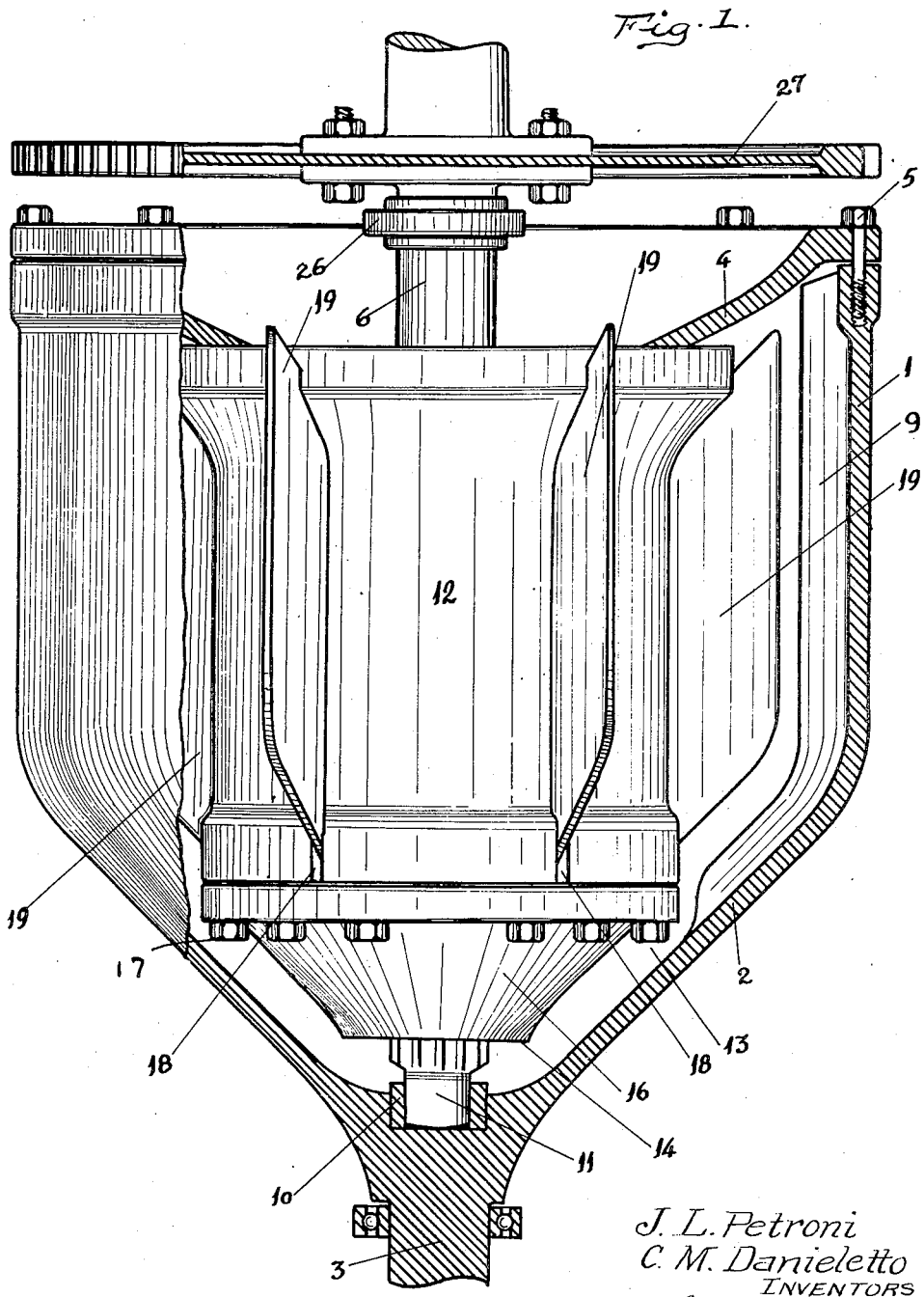

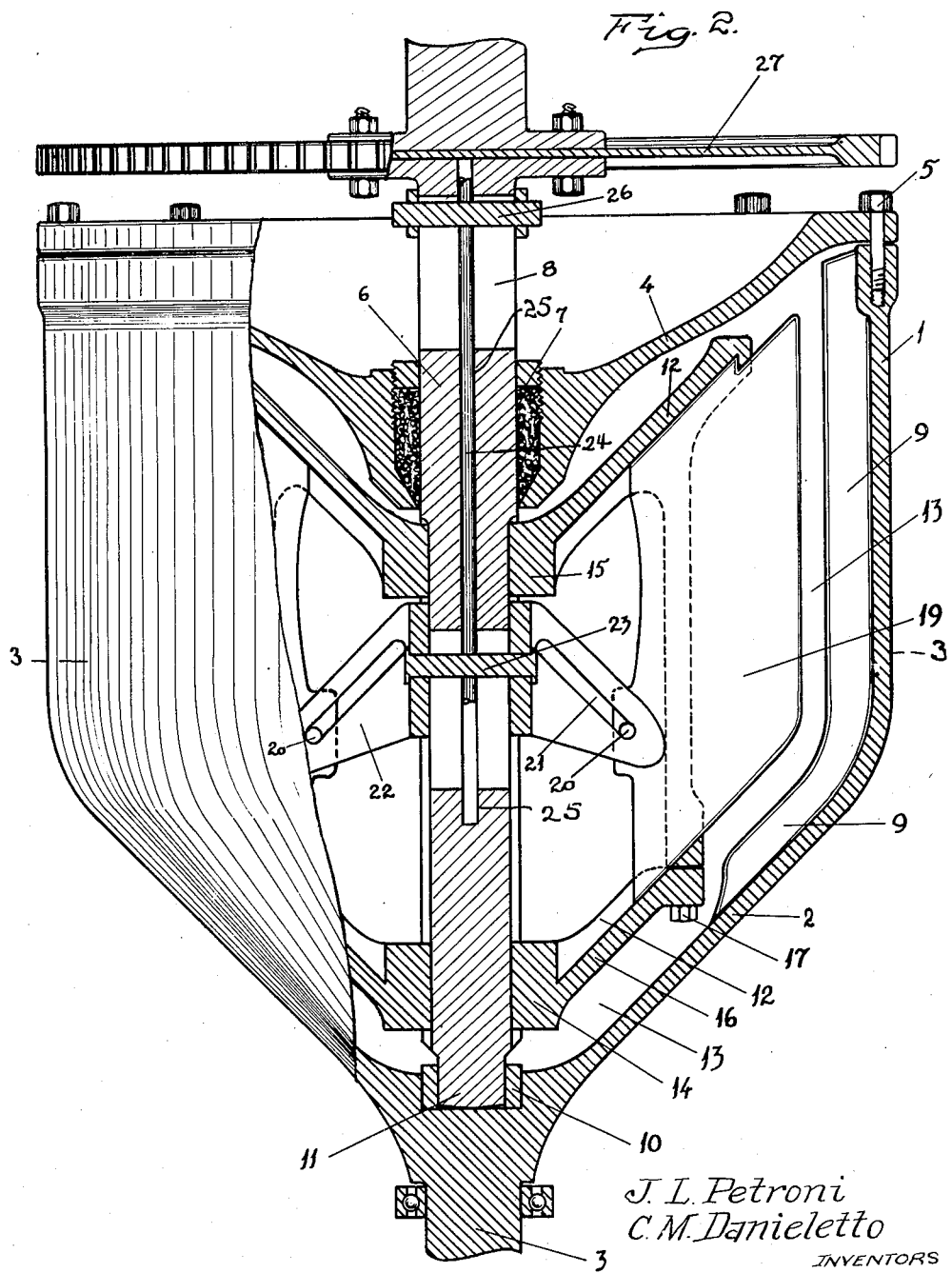

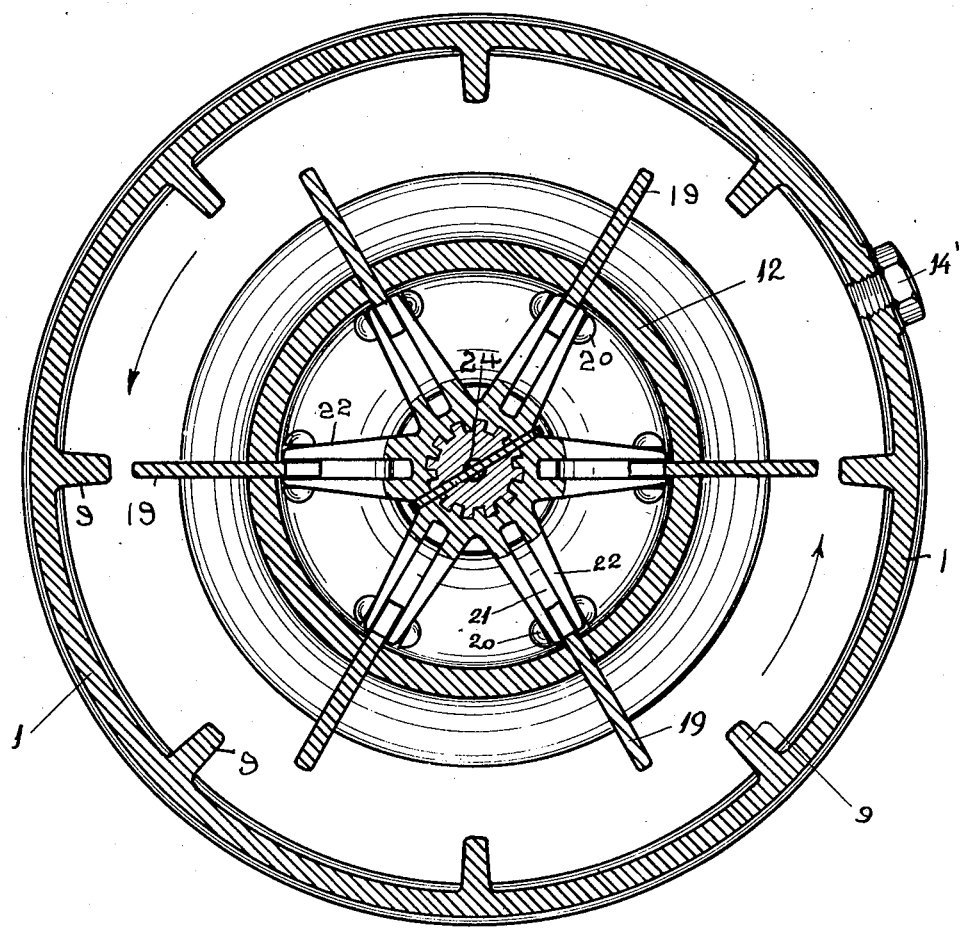

1,940,918

UNITED STATES PATENT OFFICE 1,940,918

HYDRAULIC OR FLUID CLUTCH

Juan León Petroni and Carlos Mario Danieletto, Buenos Aires, Argentina

Application November 23, 1931
Serial No. 576,858

4 Claims. (Cl. 192—58)

The present invention relates to a new hydraulic or fluid clutch to be used in connection with automobiles and motor vehicles in general, and its principal object is to provide a novel clutch system to be interconnected between the motor body and the motion transmitting shaft leading to the change speed gear box and to substitute the flywheel generally disposed behind the motor body.

The invention consists in the construction and disposition of a novel hydraulic or fluid clutch comprising an outer and inner cylinder firmly secured respectively to the motion transmitting shaft and to the driving shaft of the motor and having a hollow space left between both cylinders filled up preferably with very viscous and limy oil. Both cylinders are provided with longitudinal blades or leaves extending into said hollow space or oil chamber. While the blades projecting from the outer cylinder form integral parts thereof, the other blades are slidably mounted within longitudinal slots formed in the side wall of the inner cylinder, so that the surface of that part of a blade which extends into the oil chamber may be enlarged or diminished. The arrangement and size of these cylinders and movable blades are such that the latter by means of an operable mechanism may be moved outwardly so as to almost touch, when turning around, the edges of the blades of the outer cylinder and may be withdrawn so as to completely disappear within the inner cylinder. As the inner cylinder is rigidly mounted on the motor driving shaft, with the blades or leaves thereof extending into the filled oil chamber, the motion of said driving shaft is imparted to the amount of oil contained in the chamber, and when the current thereof reaches sufficient intensity, it will transmit the rotary motion to the outer cylinder by drawing with it the blades or leaves of the latter. As this outer cylinder forms an integral part of the motion transmitting shaft, the latter thus is also actuated, and a motion transmitting connection thus is established by this hydraulic or fluid clutch.

It will be evident that the clutch in accordance with the present invention is particularly useful in connection with explosion motors which as is broadly known are but little elastic, and that the same resolves a good deal of problems concerning the working of the motor and the driving of the vehicle.

All clutch systems as are hitherto known in connection with motor cars, are to a certain degree disadvantageous, e. g. those comprising friction discs cannot avoid that said disks are worn away. Further, a rigid clutch only can effect the coupling in a more or less rough manner and does not permit to start the vehicle at third or fourth speed without producing pulls, or without causing, even for the most elastic motors, an undesirable wearing out. For this and other reasons a constant use of the change speed gear is required; any obstacle on the road due to rigid coupling of the driving wheels with the motor will cause the motor to run at less speed and will make the operation of declutching and of changing the speed necessary, so that the motor may recover the lost speed.

The present invention does not provide a rigid coupling system, but replaces the friction for force of torsion employing a liquid means, preferably a viscous or limy oil, and as has been already stated, comprises a fluid or hydraulic clutch avoiding any wearing out of the same and making the change speed gear box and the driving wheels independent on the motor at any moment, thus securing a very smooth running of the vehicle and driving thereof considerably easier.

Another important feature of this invention consists in that the clutch on account of the slidably mounted inner blades or leaves which thus may be gradually moved into the oil chamber, renders it possible to gradually take off the power of the motor, so that declutching often is avoided and that a constant use of the change speed gear is not required at all. For the same reason the construction of said gear box may be considerably simplified, as it is only necessary to provide for the forward and reverse driving of the vehicle.

A further feature of the present invention consists in that the provision of a clutch pedal is avoided, as this hydraulic clutch will be operated by means of a corresponding handle disposed on the steering wheel, thus permitting an easier driving.

Finally, it may be repeated that, as will be readily understood, on account of rough roads the motor often will be suddenly overloaded and that similarly by suddenly stopping the vehicle, the motor will suffer heavy shocks which now will be partly, if not completely, absorbed by the clutch system in accordance with the present invention.

With these and other objects in view, the invention consists in the novel construction, arrangement and formation of parts as will be hereinafter specifically described, claimed and illustrated in the accompanying drawings, in which:

Figure 1 represents a partly sectional elevation view of the hydraulic or fluid clutch according to the present invention, the outer cylinder of the device being partly broken away;

Figure 2 represents a partly sectional elevation view similar to Figure 1, but with the outer and inner cylinder partly broken away; and Figure 3 is a transverse sectional view through the device as shown in Figure 2.

Corresponding and like parts are referred to in the following description and indicated in all the views of the drawings by the same reference characters.

Specifically describing the embodiment of the present invention, the numeral 1 designates the outer movable cylinder of the hydraulic or fluid clutch, which in its rear part 2 is cone shaped so as to finally form a shaft 3 carrying on its other end the pinion nut of the change speed gear box. On its front side the cylinder 1 is sealed by means of a cover 4 secured thereto by equally spaced screws 5 and is rotatably mounted in its centre on the driving shaft 6 by means of a stuffing box 7. The cover plate 4 is somewhat turned rearwards so as to represent an internal cone and to leave a free external space 8 along the shaft 6 between the stuffing box 7 and the front rim of the outer cylinder 1, for the purpose hereinafter to be described. Along the inner surface of the outer cylinder 1, i. e. along the side wall and half of the length of the rearwardly projecting conical part 2 a plurality of longitudinal equally spaced blades or leaves 9, preferably eight are provided which extend to a substantial height into the interior of said cylinder 1, these blades 9 forming integral parts of the cylinder body so as to reinforce it at the same time.

The inner surface of the rear end of the outer cylinder 1 is formed with a sleeve or bearing 10 to receive the rear 11 end of the driving shaft 6, which in this point as well as within the stuffing box 7 freely rotates without imparting movement to the outer cylinder 1.

Within the outer cylinder 1 another cylinder 12 is provided, both forming between them a hollow space or oil chamber 13 which may be filled by an opening in the side wall of the outer cylinder to be sealed by a corresponding cap screw 14'. The inner cylinder 12 to certain extent, but at smaller size imitates the shape of the outer cylinder 1. However, it is secured to the driving shaft 6 at 14 and 15, so that it rotates together with the latter. The inner cylinder portions 14 and 15 firmly adjusted around the shaft 6 are somewhat inlaid in the shaft body, so that sliding or axial displacement of the inner cylinder along the shaft is avoided, and further, as these the shaft encircling portions 14 and 15 are considerably reinforced, the centrifugal energy created by the rotation is conveniently and readily resisted.

While the outer cylinder 1 has its cover screwed thereto at its front end, the inner cylinder 12 provides a similar cover plate 16 at its rear end secured thereto by means of equally spaced screws 17. The side wall of the inner cylinder 12 comprises six longitudinal slots 18, in which there are six blades or leaves 19 slidably mounted and as shown in the accompanying drawings extend into the oil chamber 13 so as to almost touch the blades 9 of the outer cylinder 1 when being turned around. At their inner edge the blades or leaves 19 by means of bolts 20 engage in slots 21 provided in guide members 22 formed on the collar 23 slidably but not rotatably mounted on the driving shaft 6. Said collar 23 is connected by means of a link 24 disposed in a longitudinal groove 25 with another collar 26 embracing the shaft 6 outside the outer cylinder 1 at the level of the front end or rim of the same and at certain distance from the spur starting gear 27. The collar 26 is also slidably but not rotatably mounted on the shaft 6, and on account of the free space left around said shaft 6, which constitutes the striking distance of the collar 26, the latter may be moved rearwards until touching the stuffing box 7. This movement is transmitted by the link 24 to the collar 23 and the guide members 22, which thus cause the blades or leaves 19 on account of their slidable engagement in the slots 21 to pass through the longitudinal slots 18 moving radially from the inner cylinder into the oil chamber or vice versa.

The collar 26 may be operated by means of any suitable connection device from the handle provided on the steering wheel of the vehicle.

With reference to the operation of the described clutch system, it will be evident that when the blades or leaves 19 of the inner cylinder 12 which is rotated by the driving shaft 6, are completely withdrawn into the interior of the inner cylinder 12, the latter may turn around without imparting any motion to the amount of oil contained in the chamber 13. In this case the blade operating mechanism comprising the collars 22, 26, connecting link 24 and guide members 22, is found in the position at the rear end of its stroke. When it is desired to let in the clutch, said mechanism is slowly moved laterally to the front end of its stroke, as shown in Figures 1 and 2, and thereby the blades 19 will be caused to gradually enter the oil chamber 13 and to circulate the oil contained therein, which when the blades reach their fully working position and the current of the oil is of sufficient intensity, will turn around the outer cylinder 1 by means of its blades or leaves 9. In order to disengage, the inner blades or leaves 19 are withdrawn by moving the collar 26 back to the rear end of its stroke. Whenever the inner cylinder will continue rotating with the driving shaft 6, its motion will not be transmitted to the oil in the chamber 13, so that it may cease circulating causing thereby also the outer cylinder to stop together with the motion transmitting shaft 3.

Having thus fully described the nature of the present invention and ascertained the manner as to carry it into practice, what we claim as new, and desire to secure by Letters Patent, is:

1. A hydraulic clutch for motor vehicles and the like, comprising two hollow cylinders arranged one within the other, a drive shaft connected with the inner cylinder, radially and longitudinally movable blades mounted in the inner cylinder, said outer cylinder being rotatably mounted on the drive shaft, internal blades on the outer cylinder, and a driven shaft connected with the outer cylinder.

2. A hydraulic clutch for motor vehicles and the like, comprising hollow cylinders arranged one within the other providing a sealed oil chamber, said outer cylinder being substantially cone shaped at one end, internal blades extending along the side wall of the outer cylinder and midway the conical end portion thereof, and adjustable blades carried by the inner cylinder and movable outwardly thereof to a position adjacent the blades of the outer cylinder and adapted, when moved inwardly, to lie substantially flush with the outer surface of the inner cylinder.

3. A hydraulic clutch for motor vehicles and the like, comprising hollow cylinders arranged one within the other and providing a sealed oil chamber, blades slidably mounted in the inner cylinder and means for imparting radial movement to said blades, the last mentioned means including a collar slidably mounted within the inner cylinder and having spoke-like members thereon provided with inclined slots, and pins on said blades engaging in said inclined slots whereby radial movement is imparted to the blades incident to axial movement of said collar.

4. A hydraulic clutch for motor vehicles and the like, comprising hollow cylinders arranged one within the other and providing a sealed oil chamber, blades slidably mounted in the inner cylinder and means for imparting radial movement to said blades, the last mentioned means including a collar slidably mounted within the inner cylinder and having spoke-like members thereon provided with inclined slots, pins on said blades engaging in said inclined slots whereby radial movement is imparted to the blades incident to axial movement of said collar, a drive shaft, rigidly secured axially of the inner cylinder, and an actuating rod passing through said shaft and connected with said collar.

JUAN LEÓN PETRONI.
CARLOS MARIO DANIELETTO.